(12) United States Patent
Chern (10) Patent No.: US 11,437,082 B2
(45) Date of Patent: Sep. 6, 2022

(54) PHYSICALLY UNCLONABLE FUNCTION CIRCUIT HAVING LOWER GATE-TO-SOURCE/DRAIN BREAKDOWN VOLTAGE

(71) Applicant: HeFeChip Corporation Limited, Sai Ying Pun (HK)

(72) Inventor: Geeng-Chuan Chern, Cupertino, CA (US)

(73) Assignee: HeFeChip Corporation Limited, Sai Ying Pun (HK)

( * ) Notice: Subject to any disclaimer, the term of this patent is extended or adjusted under 35 U.S.C. 154(b) by 160 days.

(21) Appl. No.: 16/876,092

(22) Filed: May 17, 2020

(65) Prior Publication Data

US 2021/0358528 A1 Nov. 18, 2021

(51) Int. Cl.
| | |
|---|---|
| *G11C 7/24* | (2006.01) |
| *G11C 11/419* | (2006.01) |
| *H04L 9/32* | (2006.01) |
| *G06F 21/72* | (2013.01) |
| *G11C 17/08* | (2006.01) |
| *G11C 8/20* | (2006.01) |

(52) U.S. Cl.
CPC ............... *G11C 7/24* (2013.01); *G06F 21/72* (2013.01); *G11C 8/20* (2013.01); *G11C 11/419* (2013.01); *G11C 17/08* (2013.01); *H04L 9/3278* (2013.01); *H04L 2209/12* (2013.01)

(58) Field of Classification Search
CPC ..... G11C 17/14; G11C 17/146; G11C 17/165; G11C 17/08; G11C 17/00
See application file for complete search history.

(56) References Cited

U.S. PATENT DOCUMENTS

| | | |
|---|---|---|
| 3,423,646 A | 1/1969 | Cubert |
| 3,634,929 A | 1/1972 | Yoshida |
| 4,322,822 A | 3/1982 | McPherson |

(Continued)

FOREIGN PATENT DOCUMENTS

| | | |
|---|---|---|
| EP | 3 270 539 A1 | 1/2018 |
| JP | 11-274313 A | 10/1999 |

OTHER PUBLICATIONS

Liu et al., "A Gate-Oxide-Breakdown Antifuse OTP ROM Array Based on TSMC 90nm Process", 2015 IEEE, 2015.

(Continued)

*Primary Examiner* — Alfredo Bermudez Lozada
(74) *Attorney, Agent, or Firm* — Winston Hsu (57) ABSTRACT

A physically unclonable function (PUF) circuit includes a program control transistor, a program select transistor, a read select transistor, and a PUF bit storage transistor. The PUF bit storage transistor has a drain region coupled to the read select transistor, a source region coupled to a source line and the program select transistor, a channel region, a gate dielectric layer, and a gate electrode coupled to the program select transistor. The gate dielectric layer has a first portion formed on the drain region, a second portion formed on the source region, and a main portion formed on the channel region and between the first portion and the second portion, thicknesses of the first portion of the gate dielectric layer and the second portion of the gate dielectric layer being smaller than a thickness of the main portion of the gate dielectric layer.

17 Claims, 11 Drawing Sheets

(56) References Cited

U.S. PATENT DOCUMENTS

| | | |
|---|---|---|
| 4,507,757 A | 3/1985 | McElroy |
| 4,682,404 A | 7/1987 | Miller |
| 4,728,617 A | 3/1988 | Woo |
| 4,757,026 A | 7/1988 | Woo |
| 4,784,965 A | 11/1988 | Woo |
| 4,823,181 A | 4/1989 | Mohsen |
| 4,855,247 A | 8/1989 | Ma |
| 4,975,385 A | 12/1990 | Beinglass |
| 5,019,878 A | 5/1991 | Yang |
| 5,025,494 A | 6/1991 | Gill |
| 5,314,834 A | 5/1994 | Mazuré |
| 5,672,994 A | 9/1997 | Au |
| 5,796,650 A * | 8/1998 | Wik .................... G11C 11/4096 365/150 |
| 5,837,588 A | 11/1998 | Wu |
| 6,010,954 A | 1/2000 | Ho |
| 6,025,635 A | 2/2000 | Krivokapic |
| 6,097,070 A | 8/2000 | Mandelman |
| 6,218,699 B1 | 4/2001 | Kakoschke |
| 6,225,669 B1 | 5/2001 | Long |
| 6,258,641 B1 | 7/2001 | Wong |
| 6,262,451 B1 | 7/2001 | Huang |
| 6,437,389 B1 | 8/2002 | Forbes |
| 6,580,145 B2 | 6/2003 | Wu |
| 6,597,234 B2 | 7/2003 | Reber |
| 6,844,252 B2 | 1/2005 | Pan |
| 6,888,205 B2 | 5/2005 | Moscatelli |
| 6,933,554 B1 | 8/2005 | Han |
| 7,002,219 B1 | 2/2006 | de Jong |
| 7,102,910 B2 | 9/2006 | Pham |
| 7,141,862 B2 | 11/2006 | Noda |
| 7,220,649 B2 | 5/2007 | Nakamura |
| 7,402,855 B2 | 7/2008 | Kurjanowicz |
| 8,026,133 B2 | 9/2011 | Ozawa |
| 8,213,211 B2 | 7/2012 | Kurjanowicz |
| 8,237,224 B2 | 8/2012 | Nakamura |
| 8,324,042 B2 | 12/2012 | Cai |
| 8,471,355 B2 | 6/2013 | Kurjanowicz |
| 9,281,074 B2 | 3/2016 | Wu |
| 9,583,612 B1 | 2/2017 | Edwards |
| 9,741,850 B1 | 8/2017 | Hsiao |
| 10,163,783 B1 | 12/2018 | Chang |
| 10,181,357 B2 | 1/2019 | Wong |
| 10,276,679 B2 | 4/2019 | Chiu |
| 10,361,296 B2 | 7/2019 | Matocha |
| 10,529,812 B1 | 1/2020 | Edwards |
| 10,964,738 B2 | 3/2021 | Chen |
| 11,043,483 B2 | 6/2021 | Hwang |
| 2002/0197810 A1 | 12/2002 | Hanafi |
| 2004/0048876 A1 | 3/2004 | Busch |
| 2004/0150066 A1 | 8/2004 | Inoue |
| 2005/0029616 A1 | 2/2005 | Noda |
| 2006/0102928 A1 | 5/2006 | Nakamura |
| 2007/0164328 A1 | 7/2007 | Nakamura |
| 2008/0188048 A1 | 8/2008 | Nagai |
| 2009/0053885 A1 | 2/2009 | Sakamoto |
| 2009/0146220 A1 | 6/2009 | Yoo |
| 2010/0032732 A1 | 2/2010 | Booth, Jr. |
| 2010/0214008 A1 | 8/2010 | Li |
| 2013/0039117 A1 | 2/2013 | Lin |
| 2015/0061011 A1 | 3/2015 | Cheng |
| 2016/0027899 A1 | 1/2016 | Kim |
| 2016/0104542 A1 * | 4/2016 | Wu .................... G11C 16/10 365/96 |
| 2016/0373264 A1 * | 12/2016 | Katoh .................... H01L 45/08 |
| 2017/0018612 A1 | 1/2017 | Ito |
| 2017/0200650 A1 | 7/2017 | Chang |
| 2017/0263766 A1 | 9/2017 | Xia |
| 2017/0301406 A1 | 10/2017 | Wong |
| 2018/0013421 A1 | 1/2018 | Park |
| 2018/0158738 A1 | 6/2018 | Chang |
| 2018/0205563 A1 * | 7/2018 | Takaoka ................ H04L 9/3278 |
| 2019/0019866 A1 | 1/2019 | Kim |
| 2019/0027228 A1 | 1/2019 | Hsu |
| 2020/0091285 A1 | 3/2020 | Hafez |
| 2021/0020519 A1 | 1/2021 | Wang |

OTHER PUBLICATIONS

Chern, the specification, including the claims, and drawings in the U.S. Appl. No. 16/801,121, filed Feb. 25, 2020.
Chern, the specification, including the claims, and drawings in the U.S. Appl. No. 16/846,424, filed Apr. 13, 2020.
Chern, the specification, including the claims, and drawings in the U.S. Appl. No. 16/856,055, filed Apr. 23, 2020.
Chern, the specification, including the claims, and drawings in the U.S. Appl. No. 17/474,030, filed Sep. 13, 2021.

* cited by examiner

PHYSICALLY UNCLONABLE FUNCTION CIRCUIT HAVING LOWER GATE-TO-SOURCE/DRAIN BREAKDOWN VOLTAGE

BACKGROUND OF THE INVENTION

1. Field of the Invention

The invention relates to a semiconductor device, and in particular, to a physically unclonable function (PUF) circuit which includes at least one PUF bit storage transistor having a lower gate-to-source/drain breakdown voltage.

2. Description of the Prior Art

Non-volatile memory retains stored information even after power is removed from the non-volatile memory circuit. Some non-volatile memory designs permit reprogramming, while other designs only permit one-time programming. Thus, one form of non-volatile memory is a One-Time Programmable (OTP) memory. A physically unclonable function (PUF) is a device or circuit structure for use to generate unique secure data. Typically, the PUF employs the OTP memory to store PUF bits.

An OTP memory may contain an antifuse. An antifuse functions oppositely to a fuse by initially being nonconductive. When programmed, the antifuse becomes conductive. To program an antifuse, a dielectric layer such as an oxide is subjected to a high electric field to cause dielectric breakdown or oxide rupture. After dielectric breakdown, a conductive path is formed through the dielectric and thereby makes the antifuse become conductive.

To read the memory cell, a current passing through the ruptured or unruptured oxide is typically required. However, some ruptured oxides could be in a soft breakdown condition. The leakage current of the oxide in soft breakdown condition could be small. Therefore, a complicate sensing amplifier is often needed to compare the source side and drain side gate oxide leakage currents in order to determine the state of the PUF bits.

SUMMARY OF THE INVENTION

According to one embodiment of the invention, a physically unclonable function (PUF) circuit includes at least one PUF bit storage transistor having a gate-to-source/drain breakdown voltage lower than a gate-to-channel breakdown voltage and a gated source/drain junction breakdown voltage.

These and other objectives of the present invention will no doubt become obvious to those of ordinary skill in the art after reading the following detailed description of the preferred embodiment that is illustrated in the various figures and drawings.

DETAILED DESCRIPTION

Advantages and features of embodiments may be understood more readily by reference to the following detailed description of preferred embodiments and the accompanying drawings. Embodiments may, however, be embodied in many different forms and should not be construed as being limited to those set forth herein. Rather, these embodiments are provided so that this disclosure will be thorough and complete and will fully convey exemplary implementations of embodiments to those skilled in the art, so embodiments will only be defined by the appended claims. Like reference numerals refer to like elements throughout the specification.

Embodiments are described herein with reference to cross-section illustrations that are schematic illustrations of idealized embodiments (and intermediate structures). Thus, these embodiments should not be construed as limited to the particular shapes of regions illustrated herein but are to include deviations in shapes that. For example, an implanted region illustrated as a rectangle will, typically, have rounded or curved features and/or a gradient of implant concentration at its edges rather than a binary change from implanted to non-implanted region. Thus, the regions illustrated in the figures are schematic in nature and their shapes are not intended to illustrate the actual shape of a region of a device and are not intended to limit the scope of the embodiments.

It will be appreciated that although some conductivity types have been used for illustrative purposes, the invention may be practiced with opposite conductivity types. For example, an NMOS transistor in one embodiment may be replaced with a PMOS transistor in another embodiment without departing from the spirit and scope of the invention.

The present invention pertains to a physically unclonable function (PUF) circuit adopting transistors having a lower gate-to-source/drain breakdown voltage to store PUF bits, and consequently, a lower program voltage is required to program the PUF circuit, enhancing programmability. The PUF bit may randomly be in a state "1" or a state "0". The PUF circuit may utilize a channel current instead of a ruptured or unruptured dielectric leakage current during a read operation, the channel current of reading a PUF bit in the state "1" being equal to the transistor "on" current, while the channel current of reading a PUF bit in the state "0" being equal to the transistor "off" current, leading to an easy identification of the state of the PUF bit, and reducing complexity of a reading circuitry.

Figure 1:
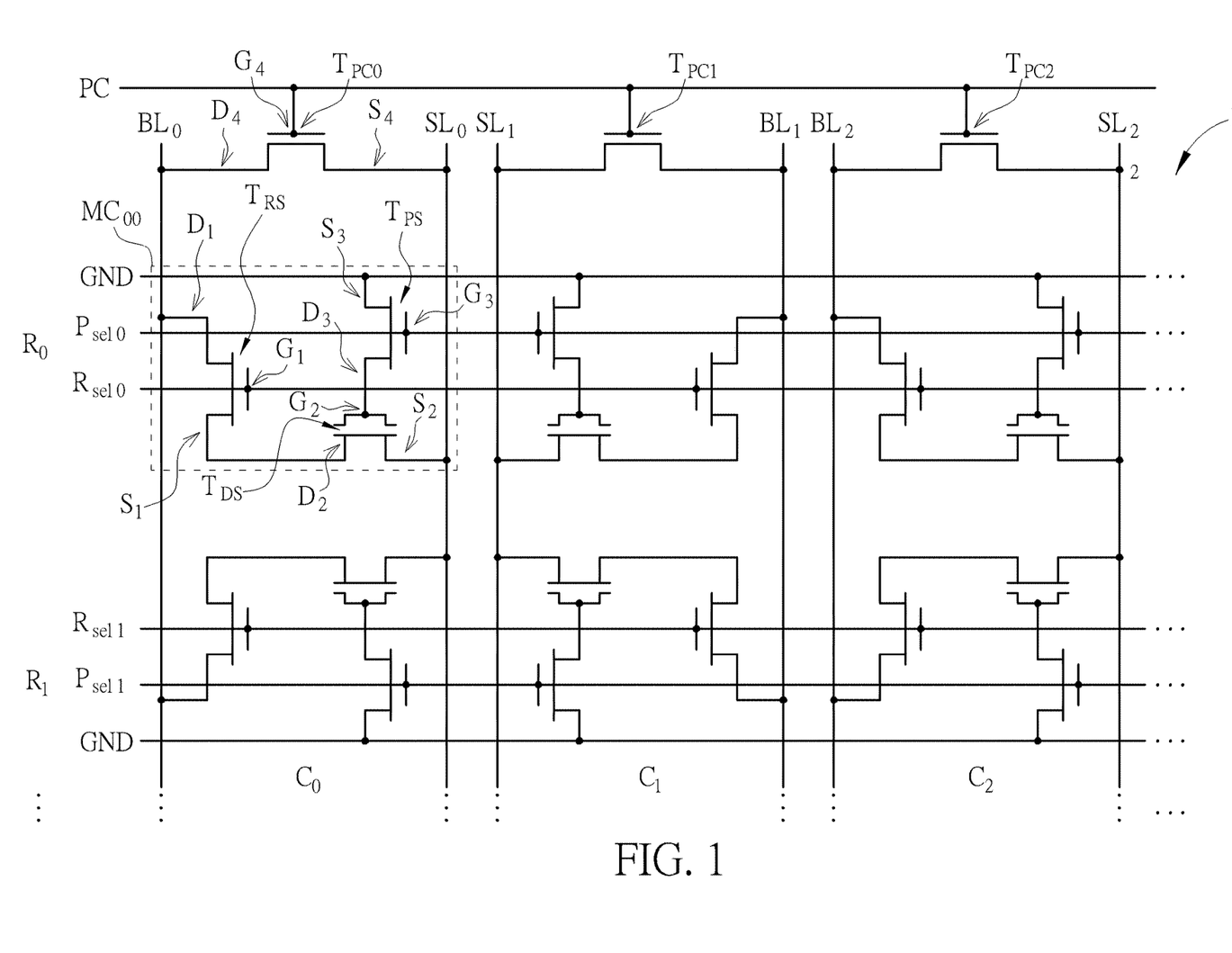
FIG. 1 is a circuit schematic of a physically unclonable function (PUF) circuit according to an embodiment of the invention.

FIG. 1 is a circuit schematic of a physically unclonable function (PUF) circuit 1 according to an embodiment of the invention. The PUF circuit 1 may include a 2-by-3 cell array, program control transistors $T_{PC0}$ to $T_{PC2}$, bit lines $BL_0$ to $BL_2$, source lines $SL_0$ to $SL_2$, a program control line PC, a ground line GND, program select lines $P_{sel0}$ to $P_{sel1}$, and read select lines $R_{sel0}$ to $R_{sel1}$. The 2-by-3 cell array may include 6 PUF cells arranged into rows $R_0$ to $R_1$ and columns $C_0$ to $C_2$. While the 2-by-3 cell array and the 3 program control transistors $T_{PC0}$ to $T_{PC2}$ are employed in the embodiment, the PUF circuit 1 may adopt other sizes of cell arrays and the corresponding numbers of program control transistors, bit lines, source lines, program select lines and read select lines to meet design requirement. For example, the PUF circuit 1 may include an N-by-M cell array, M program control transistors, M bit lines, M source lines, N program select lines and N read select lines, the N-by-M cell array including N×M PUF cells arranged in N rows and M columns, M, N being positive integers.

Each of the program control transistor $T_{PC0}$ to $T_{PC2}$ may include a gate $G_4$ coupled to the program control line PC, a drain region $D_4$ coupled to a respective bit line, and a source region $S_4$ coupled to a respective source line. For example, the program control transistor $T_{PC0}$ may include a gate $G_4$ coupled to the program control line PC, a drain region $D_4$ coupled to the bit line $BL_0$, and a source region $S_4$ coupled to the source line $SL_0$.

Each PUF cell may include 3 transistors. For example, the PUF cell $MC_{00}$ at the row $R_0$ and the column $C_0$ may include a read select transistor $T_{RS}$, a PUF bit storage transistor $T_{DS}$ and a program select transistor $T_{PS}$. The program select transistor $T_{PS}$ of the PUF cell $MC_{00}$ may include a gate $G_3$ coupled to the program select line $P_{sel0}$, a drain region $D_3$, and a source region $S_3$ coupled to the ground line GND. The read select transistor $T_{RS}$ of the PUF cell $MC_{00}$ may include a gate $G_1$ coupled to the read select line $R_{sel0}$, a drain region $D_1$ coupled to the bit line $BL_0$, and a source region $S_1$. The PUF bit storage transistor $T_{DS}$ of the PUF cell $MC_{00}$ may include a gate $G_2$ coupled to the drain region $D_3$ of the program select transistor $T_{PS}$ of the PUF cell $MC_{00}$, a drain region $D_2$ coupled to the source region $S_1$ of the read select transistor $T_{RS}$ of the PUF cell $MC_{00}$, and a source region $S_2$ coupled to the source line $SL_0$. The PUF circuit 1 may further include a semiconductor substrate on which the program control transistors $T_{PC0}$ to $T_{PC2}$, the program select transistors $T_{PS}$, the read select transistors $T_{RS}$ and the PUF bit storage transistors $T_{DS}$ of all the PUF cells are fabricated. The semiconductor substrate may be a silicon substrate or a silicon-on-insulator (SOI) substrate, but is not limited thereto.

Each program control transistor may control the program operation of respective column of PUF cells. For example, the program control transistor $T_{PC0}$ may control the program operation of the PUF cells in the column $C_0$. The program select transistor $T_{PS}$ may select a PUF cell from a column of PUF cells for programming. For example, the program select transistor $T_{PS}$ of the PUF cell $MC_{00}$ may select the PUF cell $MC_{00}$ from the column $C_0$ for programming. The read select transistor $T_{RS}$ may select a PUF cell for reading. For example, the read select transistor $T_{RS}$ of the PUF cell $MC_{00}$ may select the PUF cell $MC_{00}$ for reading. The PUF bit storage transistor $T_{DS}$ may store a PUF bit.

The read select transistors $T_{RS}$, the PUF bit storage transistors $T_{DS}$ and the program select transistors $T_{PS}$ of all the PUF cells and the program control transistors $T_{PC0}$ to $T_{PC2}$ may be NMOS transistors, the respective drain regions $D_1$, $D_2$, $D_3$, $D_4$ and the respective source regions $S_1$, $S_2$, $S_3$, $S_4$ may be $N^+$ doping regions, and the respective gates $G_1$, $G_2$, $G_3$, $G_4$ may be a single polysilicon (or single poly) layer or a metal gate. The read select transistors $T_{RS}$, the program select transistors $T_{PS}$ and the PUF bit storage transistors $T_{DS}$ of PUF cells in the adjacent rows, e.g., the row R0 and R1, may be arranged in a symmetrical fashion as shown in FIG. 1, but are not limited to.

Figure 2:
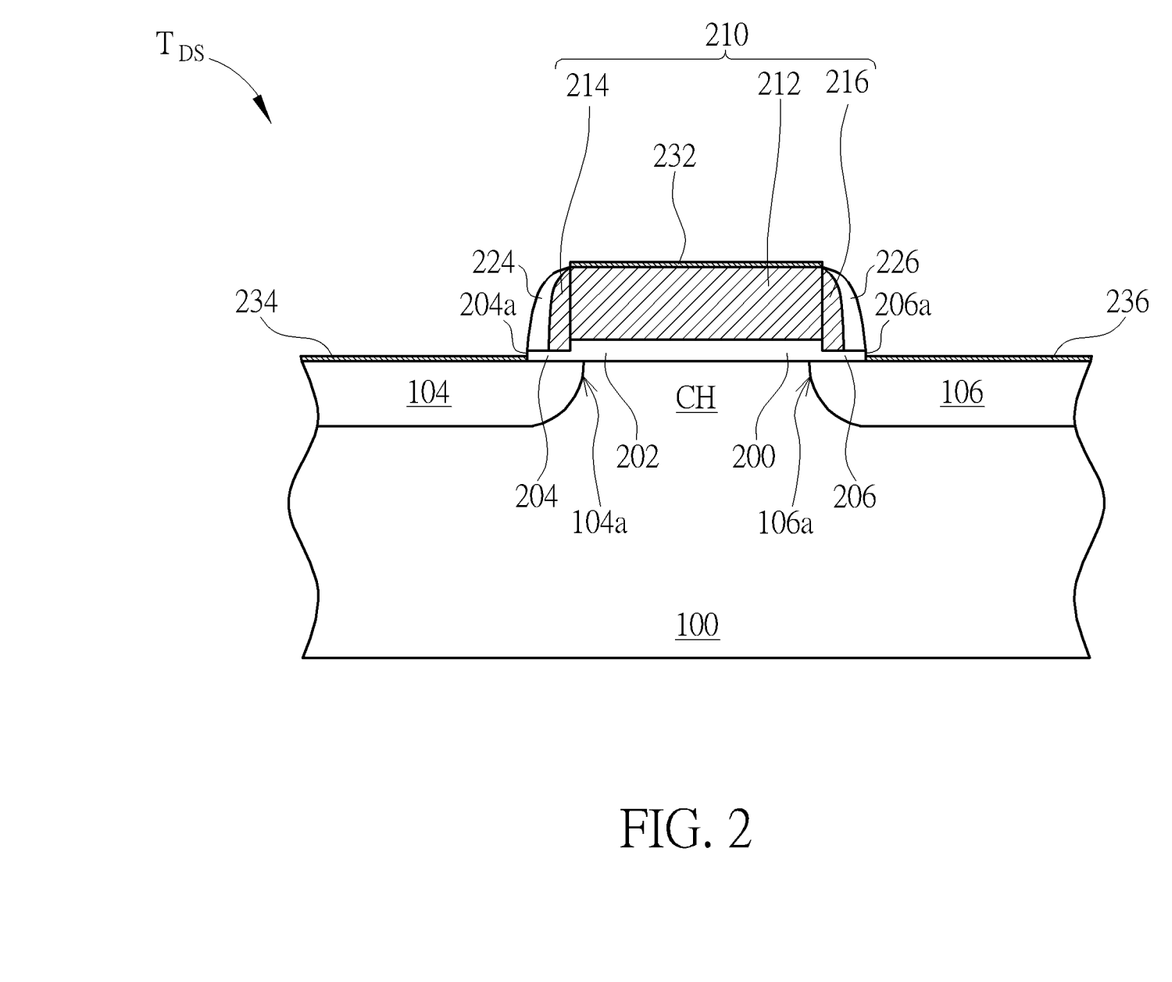
FIG. 2 is a cross section of an exemplary PUF bit storage transistor of the PUF circuit in FIG. 1.

FIG. 2 is a cross section of an exemplary PUF bit storage transistor $T_{DS}$ of the PUF circuit 1. The PUF bit storage transistor $T_{DS}$ has a lower gate-to-source/drain breakdown voltage than a gate-to-channel breakdown voltage and a gated source/drain junction breakdown voltage, thereby enhancing program reliability.

The PUF bit storage transistor $T_{DS}$ comprises a drain region 104 formed on the semiconductor substrate 100, a source region 106 formed on the semiconductor substrate 100, a channel region CH formed between the drain region 104 and the source region 106, a gate dielectric layer 200 having a portion 204 formed on the drain region 104, a portion 206 formed on the source region 106, and a main portion 202 formed on the channel region CH and between the portion 204 and the portion 206, and a gate electrode 210 formed on the portions 202, 204 and 206 of the gate dielectric layer 200. The drain region 104 may be coupled to the source region $S_1$ of the read select transistor $T_{RS}$. The source region 106 may be coupled to the source line SL. The gate electrode 210 may be coupled to the drain region $D_3$ of the program select transistor $T_{PS}$.

When programming the PUF bit storage transistor $T_{DS}$, high voltages may be simultaneously applied across the drain region 104 and the gate electrode 210, and across the source region 106 and the gate electrode 210, so as to rupture the portion 204 or the portion 206 in a random manner. The high voltage sufficient for rupturing the portion 204 is referred to as a gate-to-drain breakdown voltage, and the high voltage sufficient for rupturing the portion 206 is referred to as a gate-to-source breakdown voltage. Further, the high voltage sufficient for rupturing the main portion 202 is referred to as a gate-to-channel breakdown voltage.

According to one embodiment of the invention, the portions 204 and 206 have thicknesses smaller than a thickness of the main portion 202, achieving a gate-to-source/drain breakdown voltage lower than gate-to-channel breakdown voltage of the PUF bit storage transistor $T_{DS}$. According to one embodiment of the invention, the portion 204 and the portion 206 are substantially equal in thickness, resulting in substantially equal gate-to-drain breakdown voltage and gate-to-source breakdown voltage.

According to one embodiment of the invention, the gate electrode 210 comprises a main gate portion 212 disposed directly above the channel region CH and two gate extension portions 214 and 216 disposed next to two opposite sidewalls of the main gate portion 212. The extension gate portion 214 is situated directly on the portion 204, and the extension portion 216 is situated directly on the portion 206. The extension gate portion 214 is in direct contact with the portion 204 of the gate dielectric layer 200 and the extension portion 216 is in direct contact with the portion 206 of the gate dielectric layer 200. According to one embodiment of the invention, the main gate portion 212, the gate extension portion 214, and the gate extension portion 216 may be composed of doped polysilicon, silicide, or metal, but is not limited thereto.

According to one embodiment of the invention, the PUF bit storage transistor $T_{DS}$ may further comprise dielectric spacers 224 and 226. The dielectric spacer 224 is formed beside the gate extension portion 214, and the dielectric spacer 226 is formed beside the extension portion 216. According to one embodiment of the invention, for example, the dielectric spacers 224 and 226 may comprise silicon nitride, silicon oxynitride or silicon oxide, but is not limited thereto. According to one embodiment of the invention, an end surface 204a of the portion 204 is aligned with an outer surface of the dielectric spacer 224 and an end surface 206a of the portion 206 is aligned with an outer surface of the dielectric spacer 226. According to another embodiment of the invention, the dielectric spacers 224 and 226 are in direct contact with the top surfaces of the drain region 104 and source region 106 of the PUF bit storage transistor $T_{DS}$, respectively.

According to one embodiment of the invention, the PUF bit storage transistor $T_{DS}$ further comprises a self-aligned silicide (or salicide) layer 232 on the gate electrode 210, a salicide layer 234 on the drain region 104, and a salicide layer 236 on the source region 106. According to one embodiment of the invention, salicide layers 232, 234 and 236 may comprise NiSi, CoSi, TiSi, or WSi, but is not limited thereto. According to one embodiment of the invention, the salicide layer 234 is contiguous with the end surface 204a, and the salicide layer 236 is contiguous with the end surface 206a.

According to one embodiment of the invention, the PN junction 104a, which is between the drain region 104 and the channel region CH and is proximate to the top surface of the semiconductor substrate 100, has an end directly underneath the main gate portion 212. According to one embodiment of the invention, the PN junction 106a, which is between the source region 106 and the channel region CH and is proximate to the top surface of the semiconductor substrate 100, has an end directly underneath the main gate portion 212. By providing such configuration, a higher gated source/drain junction breakdown voltage can be provided. According to one embodiment of the invention, PUF bit storage transistor $T_{DS}$ has a gate-to-source/drain breakdown voltage that is lower than a gate-to-channel breakdown voltage and the gated source/drain junction breakdown voltage.

In some embodiments, the semiconductor substrate 100 may be a P type semiconductor substrate (P Substrate). In other embodiments, the semiconductor substrate 100 may adopt a triple well structure comprising a P well, a deep N well and a P substrate from top to bottom, the deep N well being formed in the P Substrate and the P well being isolated from the P type semiconductor substrate by the deep N well. During program or read operations, the P well may be biased to a predetermined P well voltage through a P well pickup region (not shown in this figure). In some embodiments, the PUF circuit 1 may further comprise other elements such as spacers on sidewalls of the gates or lightly doped drain (LDD) regions merged with the heavily doped source/drain regions, which are not explicitly shown in the figures for the sake of simplicity.

The PUF circuit 1 adopts transistors having a lower gate-to-source/drain breakdown voltage to store PUF bits, requiring a lower program voltage and enhancing programmability.

Figure 3:
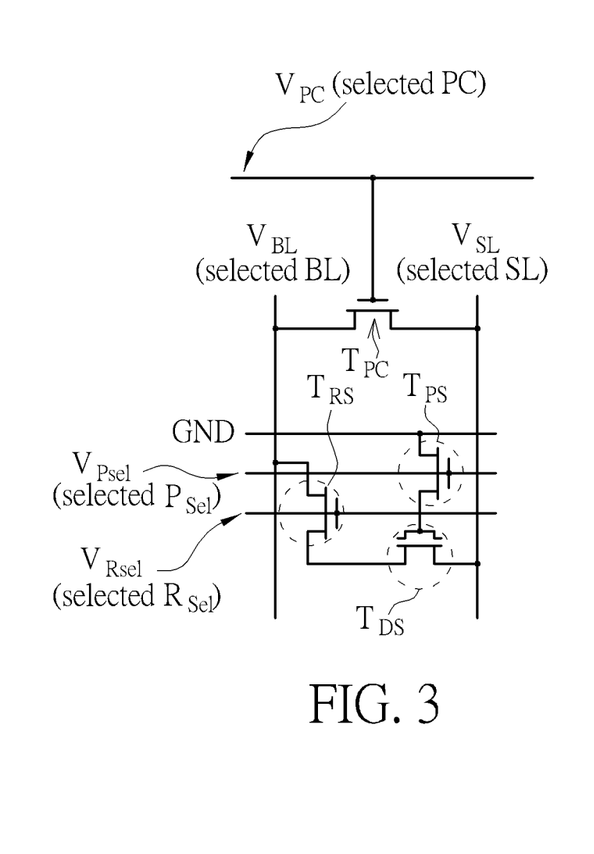
FIG. 3 shows a PUF bit storage transistor $T_{DS}$ of the PUF circuit in FIG. 1 being selected for a programming operation.
Figure 4:
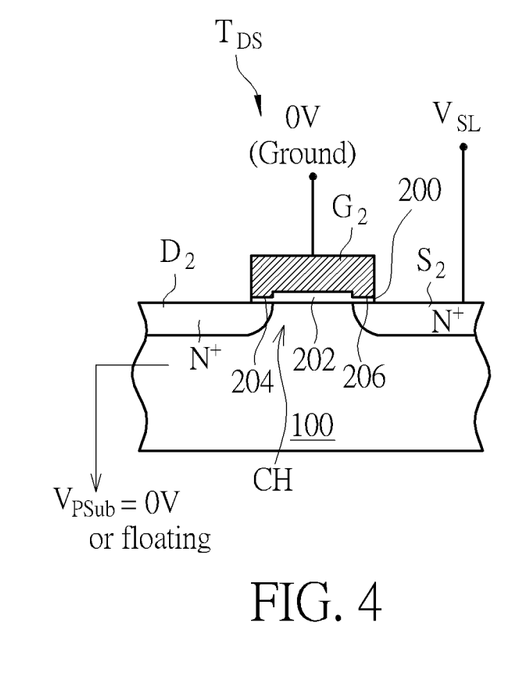
FIG. 4 shows a cross section of the PUF bit storage transistor in FIG. 3.

The PUF bit storage transistor $T_{DS}$ of each PUF cell in the PUF circuit 1 may be programmed into the state "1" or the state "0" in a random manner. FIG. 3 shows the PUF bit storage transistor $T_{DS}$ being selected for programming. FIG. 4 shows a cross section of the PUF bit storage transistor $T_{DS}$ in FIG. 3. In the programming operation, a method of programming the PUF circuit 1 may include the following steps:

(i) grounding the semiconductor substrate 100 and the ground line GND;
(ii) electrically floating the selected source line SL;
(iii) turning on the program select transistor $T_{PS}$ by applying a program select voltage $V_{Psel}$ to the selected program select line $P_{sel}$, thereby coupling the gate $G_2$ of the PUF bit storage transistor $T_{DS}$ to ground;

(iv) turning on the read select transistor $T_{RS}$ by applying a read select voltage $V_{Rsel}$ to the selected read select line $R_{sel}$, wherein the read select voltage $V_{Rsel}$ is higher than the gate-to-drain/source breakdown 200;

(v) turning on the program control transistor $T_{PC}$ by applying a program control voltage $V_{PC}$ higher than the gate-to-source breakdown voltage to the selected program control line PC, thereby coupling the selected source line SL to the selected bit line BL; and (vi) ramping up a bit line voltage $V_{BL}$ applied to the selected bit line BL through a current limiter until one of the first portion 204 and the second portion 206 breaks down, causing $V_{BL}$ to drop and, thus, leaving the other intact.

Table 1 shows an exemplary bias condition for programming the selected PUF cell in FIG. 3.

TABLE 1

| Program bias Condition | |
|---|---|
| Terminal | Bias Voltage |
| PC, $V_{PC}$ | 3-10 V |
| Selected $P_{Sel}$, $V_{Psel}$ | 1-3 V |
| Selected $R_{Sel}$, $V_{Rsel}$ | 3-10 V |
| Unselected $P_{Sel}$, unselected $R_{Sel}$ | 0 V |
| Selected BL, $V_{BL}$ | 3-10 V or Ramp up from 0 V till breakdown |
| Unselected BL | 0 V or Floating |
| Selected SL, $V_{SL}$ | Floating |
| Unselected SL | 0 V or Floating |
| P-well, $V_{PW}$ | 0 V or Floating |
| $V_{PSub}$/$V_{DNW}$ | 0 V or Floating |

According to one embodiment of the invention, to program the selected the PUF cell in the PUF circuit 1, the following bias conditions may be implemented:

(i) a high enough program control voltage $V_{PC}$ ranging between, for example, 3-10V is applied to the program control line PC;

(ii) a program select voltage $V_{Psel}$ of about 1-3V is applied to the selected program select line $P_{sel}$ (selected $P_{sel}$) to turn on the program select transistor $T_{PS}$;

(iii) a high enough read select voltage $V_{Rsel}$ ranging between, for example, 3-10V is applied to the selected read select line $R_{sel}$ (selected $R_{sel}$);

(iv) all the unselected program select lines $P_{sel}$ (unselected $P_{sel}$) and unselected read select lines $R_{sel}$ (unselected $R_{sel}$) are connected to ground GND (or 0V);

(v) the semiconductor substrate 100 (e.g., P Substrate) is usually connected to ground ($V_{PSub}$=0V), and for the triple well structures, the deep N well 110 is connected to ground ($V_{DNW}$=0V) while the P well 120 may be floating or connected to ground ($V_{PW}$=0V or floating);

(vi) the selected source lines SL are floating and all the unselected source lines SL and the unselected bit lines BL are floating or connected to ground (0V); and (vii) the selected bit line voltage $V_{BL}$ is ramped up, preferred to be through a current limiter to prevent overloading the bit line voltage supply circuit, until a sudden drop in the bit line voltage $V_{BL}$, indicating completion of the programming operation.

Alternatively, the dielectric breakdown may be caused by simply applying a pre-set bit line voltage $V_{BL}$ that is higher than the gate-to-source/drain breakdown voltage to the selected bit line BL, which is also preferred to be done through a current limiter to prevent overloading the bit line voltage supply circuit.

Any reasonable technological change or step adjustment made to the method of programming the PUF circuit 1 is within the scope of the disclosure.

The PUF bit storage transistor $T_{DS}$ may have a source junction breakdown voltage and a drain junction breakdown voltage, which are higher than the gate-to-source/drain breakdown voltage of the PUF bit storage transistor $T_{DS}$. However, this is not necessary for the embodiments with triple well structures. Further, the gate-to-source/drain breakdown voltage and the source/drain junction breakdown voltage of the read select transistor $T_{RS}$ are both higher than the gate dielectric breakdown voltage of the PUF bit storage transistor $T_{DS}$. This can be achieved by using thicker gate dielectric or cascoding two transistors for the read select transistor $T_{RS}$.

Figure 5:
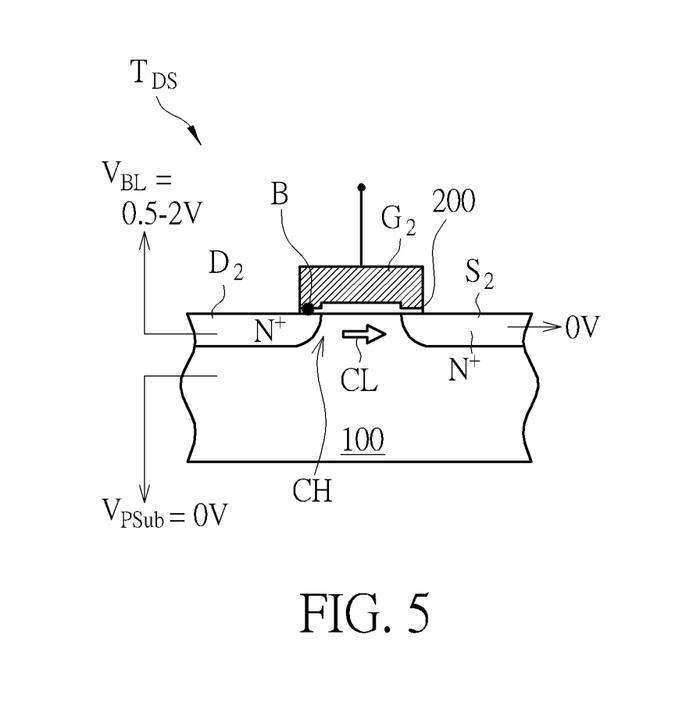
FIG. 5 shows a cross section of a PUF bit storage transistor of the PUF circuit in FIG. 1 set in the state "1" and being selected for a read operation.
Figure 6:
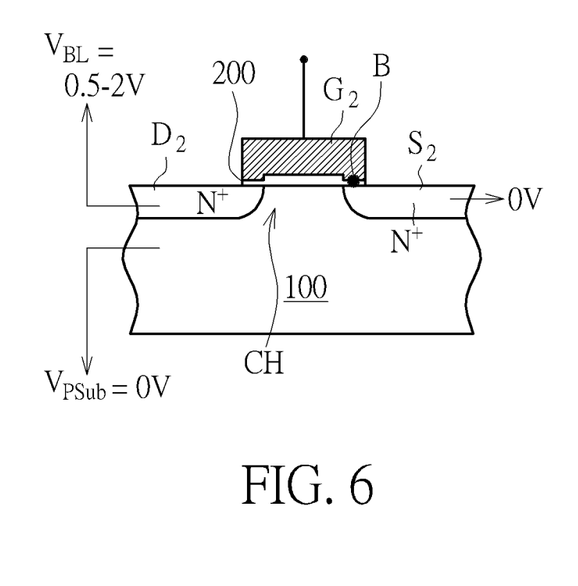
FIG. 6 shows a cross section of a PUF bit storage transistor $T_{DS}$ of the PUF circuit in FIG. 1 set in the state "0" and being selected for a read operation.

The PUF bit may be read from each PUF cell. FIG. 5 shows a cross section of the PUF bit storage transistor $T_{DS}$ set in the state "1" and being selected for a read operation. FIG. 6 is a cross section of the PUF bit storage transistor $T_{DS}$ set in the state "0" and being selected for a read operation. In the read operation, a method of reading the PUF bit storage transistor $T_{DS}$ may include the following steps:

(i) the program control line PC is connected to ground (0V) to turn off all program control transistors $T_{PC}$, disconnecting the source line SL from the bit line BL;

(ii) all the program select lines $P_{sel}$ are connected to ground (0V) to turn off all program select transistors $T_{PS}$ so that all the gates $G_2$ of the PUF bit storage transistors $T_{DS}$ are isolated from the outside bias. Therefore, the voltage of the gate $G_2$ of the PUF bit storage transistor $T_{DS}$ is the same as that of the drain region $D_2$ if the dielectric breakdown B, caused during the programming operation, is on the drain side (as in FIG. 5), and the same as that of source region $S_2$ if the dielectric breakdown B is on the source side (as in FIG. 6);

(iii) a read select voltage $V_{RSel}$ of about 1-3V is applied to the selected read select lines $R_{sel}$ so that drain of the selected PUF bit storage transistor $T_{DS}$ is connected to the selected bit line BL to which a bit line voltage $V_{BL}$ of 0.5-2V is applied; and (vi) all the other terminals are connected to ground (0V).

Table 2 shows an exemplary bias condition for reading the PUF bit storage transistor $T_{DS}$ in FIGS. 5 and 6.

TABLE 2

| Read Bias Condition | |
|---|---|
| Terminal | Bias Voltage |
| PC, $V_{PC}$ | 0 V |
| All $P_{Sel}$ | 0 V |
| Selected $R_{Sel}$ | 1-3 V |
| Unselected $R_{Sel}$, | 0 V |
| Selected BL | 0.5-2 V |
| Unselected BL | 0 V or Floating |
| All SL | 0 V |
| Others | 0 V |

Under the aforesaid read bias conditions, the PUF bit storage transistor $T_{DS}$ has a high channel current CL if the dielectric breakdown B is on the drain side because the gate voltage is high and substantially equal to the voltage applied to the drain region $D_2$, and the PUF bit storage transistor $T_{DS}$ ("1" state) is turned on. On the other hand, for the PUF bit storage transistor $T_{DS}$ in "0" state, there is no channel current (or only an insignificant amount of off-current) because the voltage coupled to the gate $G_2$ is low, same as the voltage applied to the source region $S_2$, and the PUF bit storage transistor $T_{DS}$ ("0" state) is turned off. Therefore, the read current path is not through the ruptured dielectric, but is through the channel region CH of the PUF bit storage transistor $T_{DS}$.

According to some embodiments, all the isolated gates $G_2$ of the PUF bit storage transistors $T_{DS}$ may be pre-charged by turning on all read select transistors $T_R$ simultaneously and applying 0.5-2V to all bit lines BL and 0V to all source line SL for a short period of time (e.g., 3 ms) prior to reading the entire PUF circuit 1. This can prevent those soft breakdown bits from errors due to slow charging.

To program and read the random code of the whole PUF array, conventional peripheral circuits including control circuits, multiplexer circuits, sensing circuit, etc., not shown, can be implemented. Since the cell current difference between "0" and "1" is very significant, a simple logic gate such as a NOT gate or an inverter sensing circuit, instead of complicate sensing amplifier or comparator circuit, may be used in some embodiments.

FIG. 7 to FIG. 13 are schematic diagrams showing an exemplary method for fabricating the PUF bit storage transistor having lower gate-to-source/drain breakdown voltage according to one embodiment of the invention, wherein like layers, elements or regions are designated by like numeral numbers or labels.

Figure 7:
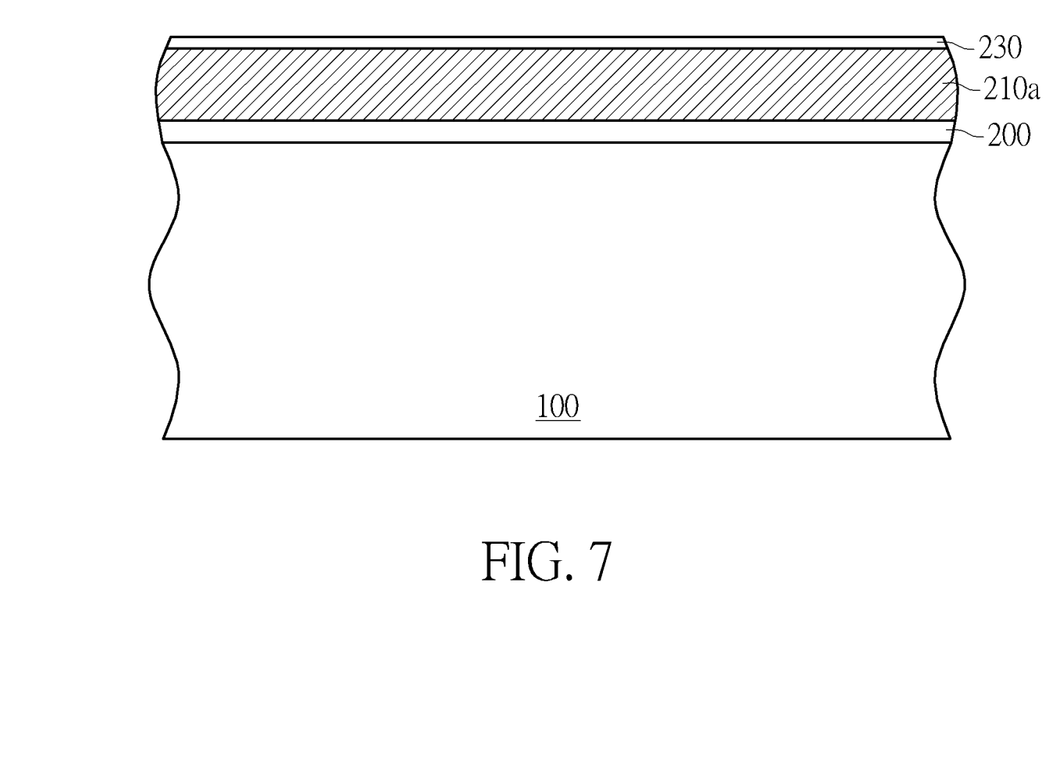
FIG. 7 to FIG. 13 are schematic diagrams showing an exemplary method for fabricating the PUF bit transistor having lower gate-to-source/drain breakdown voltage according to one embodiment of the invention.

As shown in FIG. 7, a semiconductor substrate 100 such as a P type silicon substrate is provided. A gate dielectric layer 200 such as silicon dioxide (SiO2), silicon oxynitride (SiON) or hafnium dioxide (HfO2) is deposited on the semiconductor substrate 100. According to one embodiment, the gate dielectric layer 200 may have a thickness of about 2-20 nm, but is not limited thereto. A first conductive layer 210a such as N-doped polysilicon, silicide or metal is then deposited on the gate dielectric layer 200. According to one embodiment, the first conductive layer 210a may have a thickness of about 80-200 nm, but is not limited thereto. Optionally, a cap nitride layer 230 may be deposited on the first conductive layer 210a. For example, the cap nitride layer 230 may be a silicon nitride layer and may have a thickness of about 5-10 nm.

It will be appreciated that although some conductivity types have been used for illustrative purposes, the invention may be practiced with opposite conductivity types.

Figure 8:
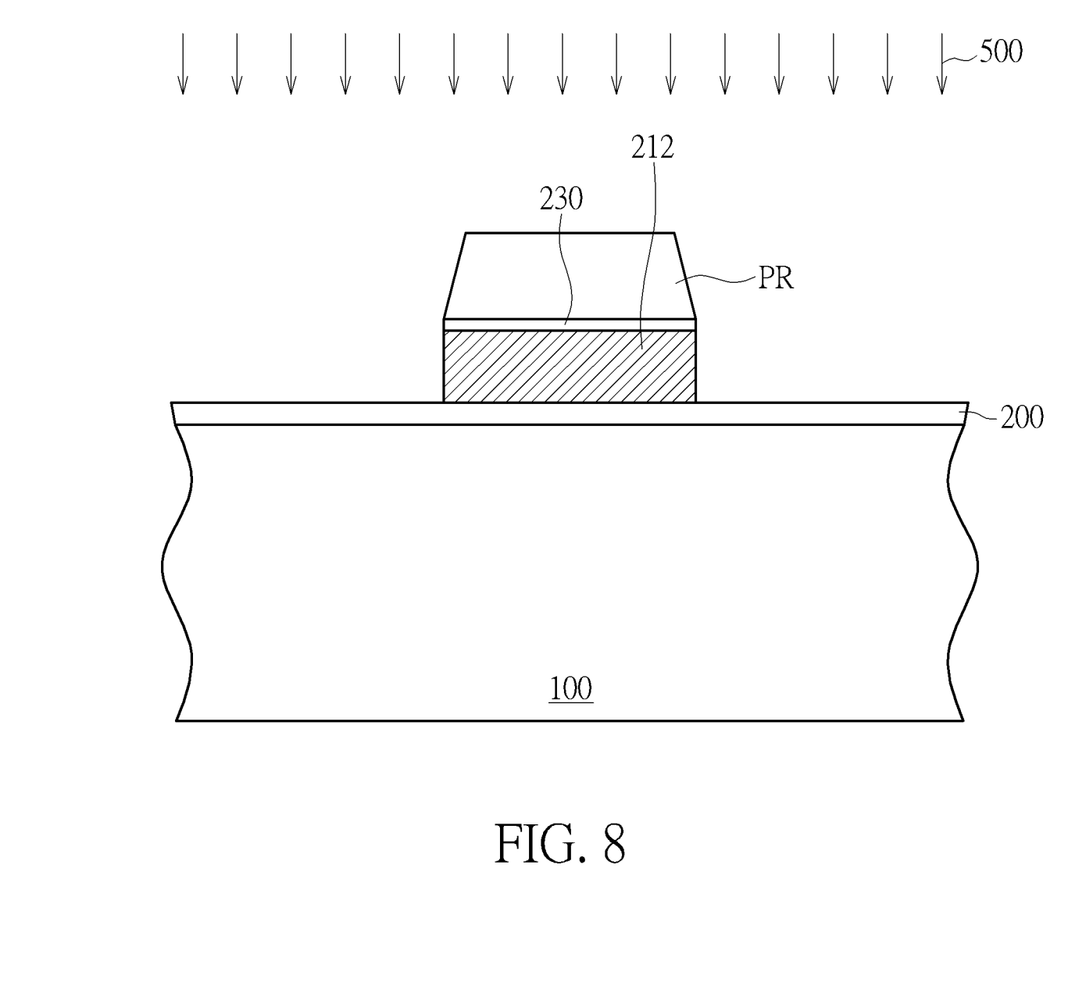

Subsequently, as shown in FIG. 8, a photoresist pattern PR is formed on the cap nitride layer 230 to define gate area. An anisotropic etching process 500 is then performed to remove the cap nitride layer 230 and the first conductive layer 210a not covered by the photoresist pattern PR, thereby forming a main gate portion 212. At this point, the gate dielectric layer 200 is substantially not etched.

Figure 9:
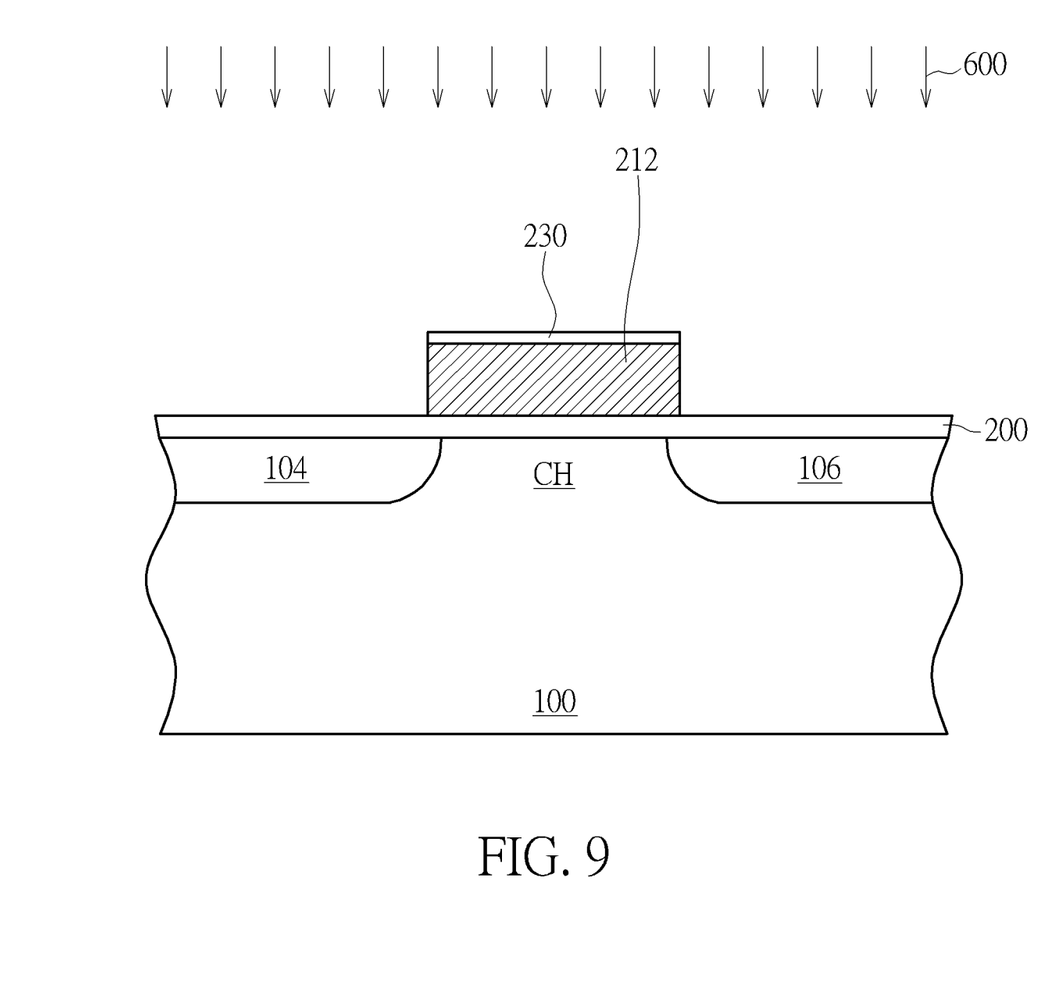

As shown in FIG. 9, the remaining photoresist pattern PR is removed. An ion implantation process 600 is then performed to implant N type dopants into the semiconductor substrate 100, followed by an optional annealing step, thereby forming N+ drain region 104 and N+ source region 106. According to one embodiment, the N+ drain region 104 and N+ source region 106 may be formed with graded junction, which may be formed by using, for example, doubly diffused method, for higher junction breakdown voltage.

Figure 10:
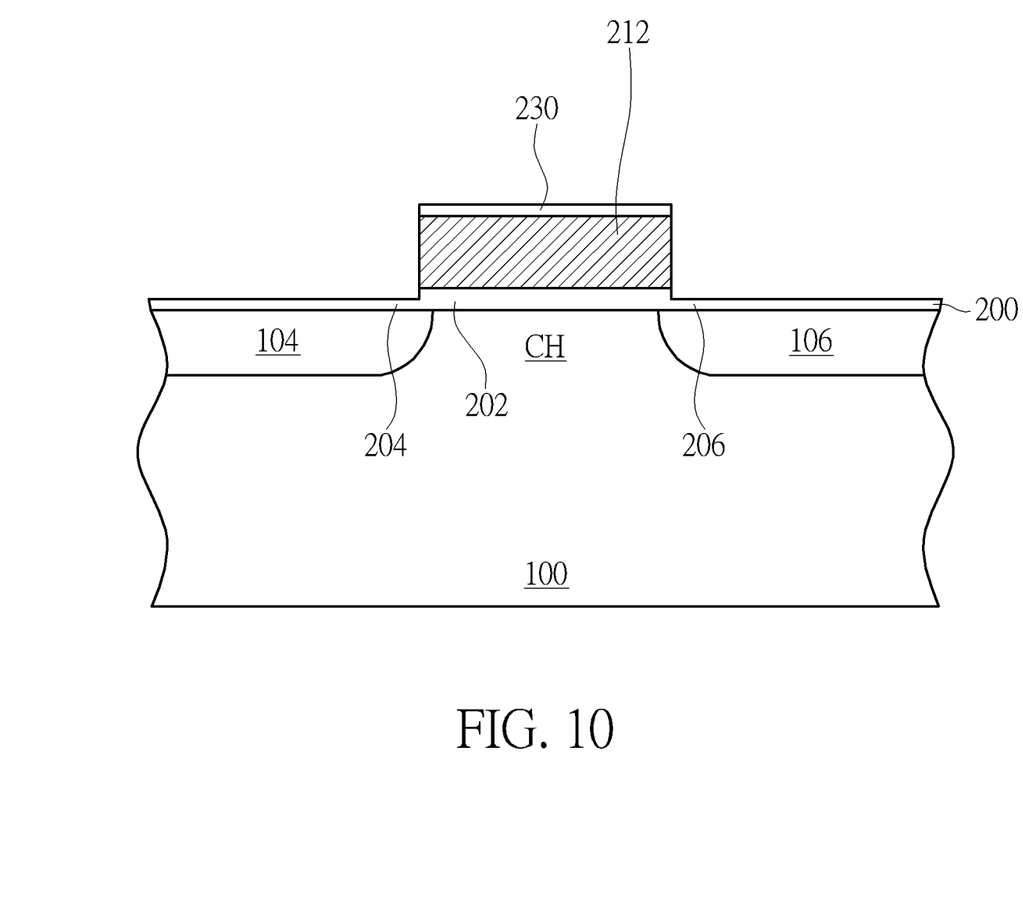

As shown in FIG. 10, an etching process is performed to remove an upper portion of the gate dielectric layer 200, thereby forming a thinner portions 204 and 206 on the N+ drain region 104 and the N+ source region 106, respectively. The portions 204 and 206 may be thinned down to thickness of 30-70% of the original thickness. According to one embodiment, the etching process may be a wet etching process, but is not limited thereto. It is understood that in some embodiments the ion implantation process 600 in FIG. 9 may be performed after gate dielectric thinning down.

Figure 11:
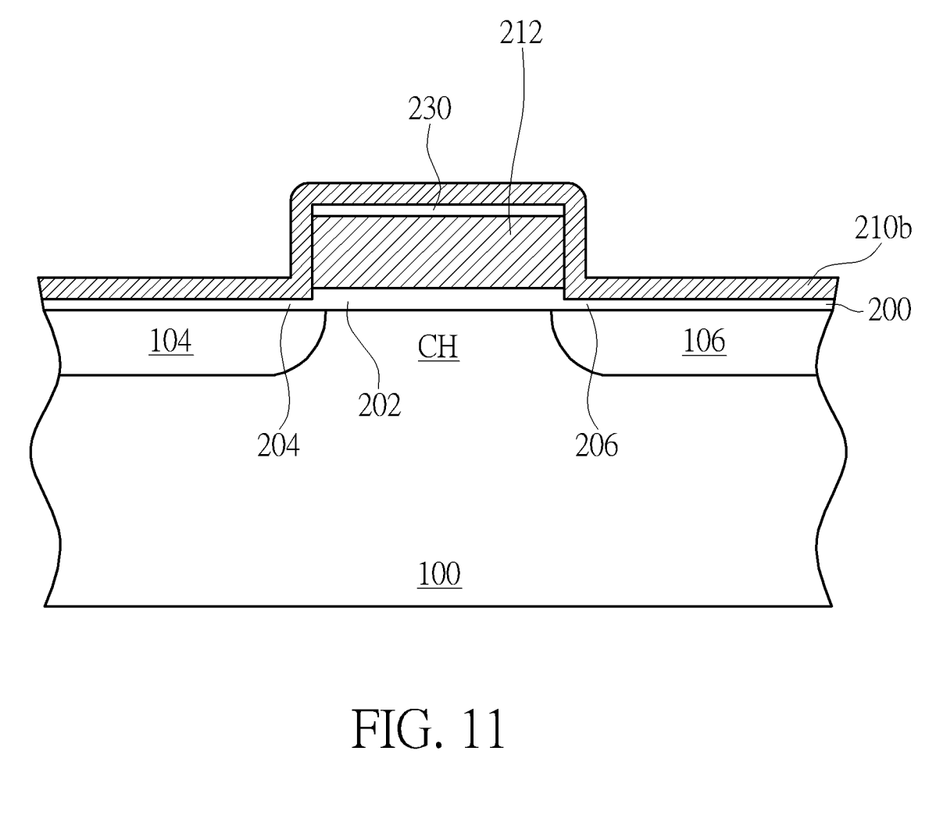

As shown in FIG. 11, a second conductive layer 210b such as N-doped polysilicon, silicide or metal is deposited on the semiconductor substrate 100. The second conductive layer 210b conformally covers the main gate portion 212 and the thinner portions 204 and 206. The second conductive layer 210b is in direct contact with the sidewalls of the main gate portion 212. According to one embodiment, the second conductive layer 210b may have a thickness of about 20-100 nm.

Figure 12:
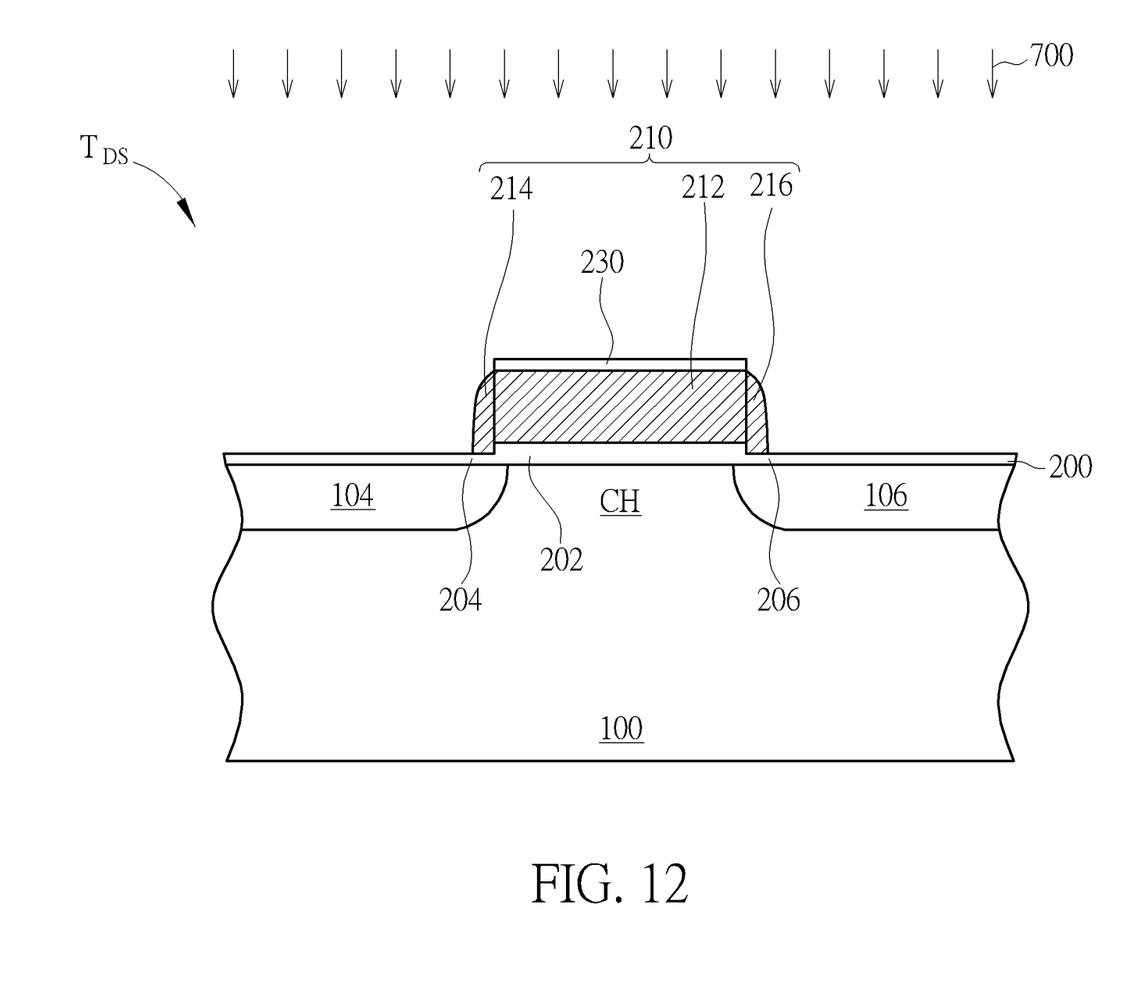

As shown in FIG. 12, an anisotropic etching process 700 is then performed to etch the second conductive layer 210b, thereby forming extension gate portions 214 and 216 on the opposite sidewalls of the main gate portion 212. The extension gate portion 214 is situated directly on the portion 204 of the gate dielectric layer 200 and the extension portion 216 of the gate electrode 210 is situated directly on the portion 206 of the gate dielectric layer 200.

Figure 13:
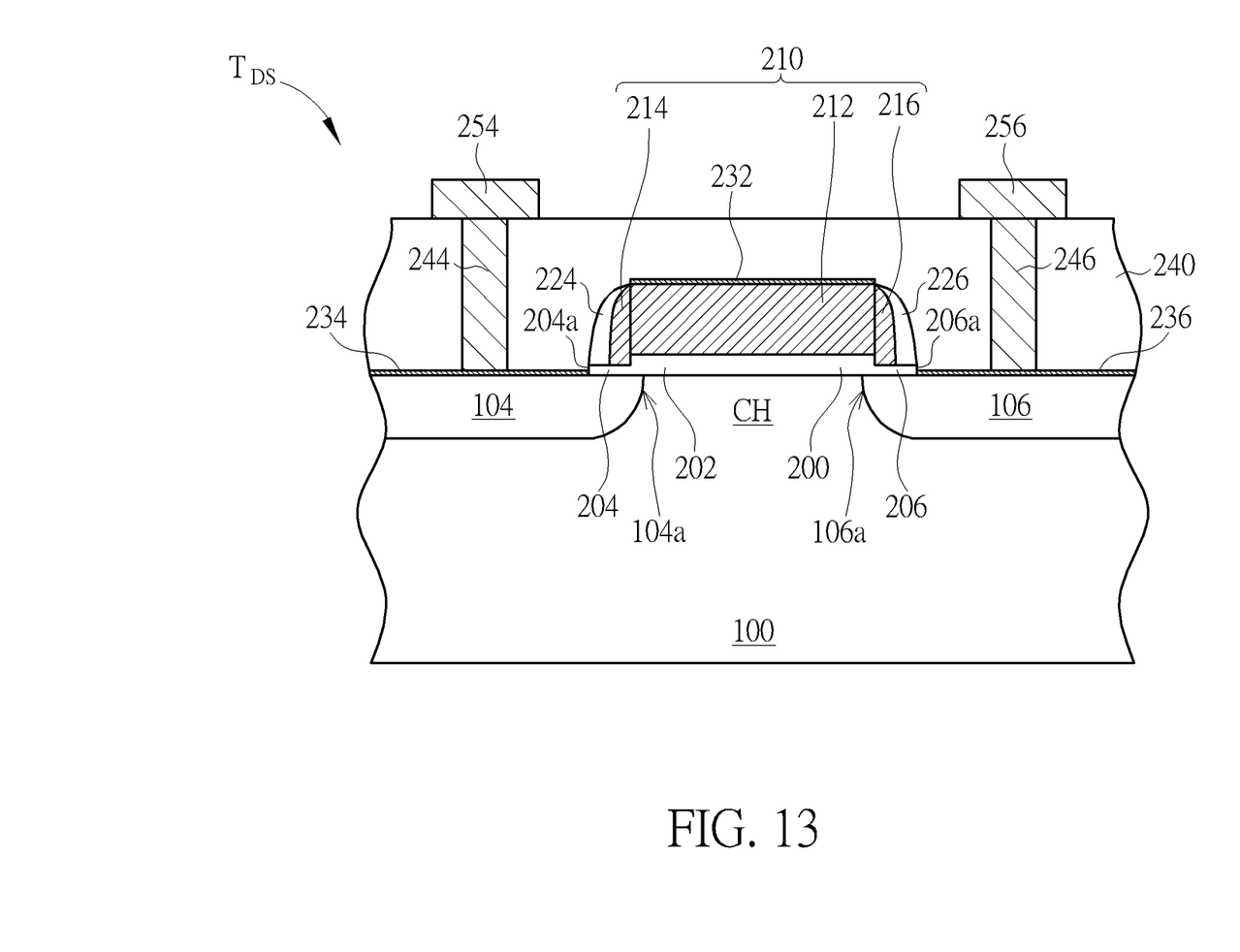

Optionally, the cap nitride layer 230 is removed. Subsequently, a dielectric spacer 224 and a dielectric spacer 226 are, as shown in FIG. 13. It is understood that the cap nitride layer 230 can also be removed at an etch step during formation of dielectric spacers 224 and 226.

The outer surface of the extension gate portion 214 is covered with the dielectric spacer 224 and the outer surface of the extension portion 216 is covered with the dielectric spacer 226. According to one embodiment of the invention, for example, the dielectric spacers 224 and 226 may comprise silicon nitride, silicon oxynitride or silicon oxide, but is not limited thereto. According to one embodiment of the invention, an end surface 204a of the portion 204 is aligned with an outer surface of the dielectric spacer 224 and an end surface 206a of the portion 206 is aligned with an outer surface of the dielectric spacer 226. Therefore, the dielectric spacer 224 is situated on the portion 204, and the dielectric spacer 226 is situated on the portion 206.

A self-aligned silicidation process is then performed to form a salicide layer 232 on the gate electrode 210, a salicide layer 234 on the drain region 104, and a salicide layer 236 on the source region 106. According to one embodiment of the invention, salicide layers 232, 234 and 236 may comprise NiSi, CoSi, TiSi, or WSi, but is not limited thereto. According to one embodiment of the invention, the salicide layer 234 is contiguous with the end surface 204a of the portion 204, and the salicide layer 236 is contiguous with the end surface 206a of the portion 206.

According to one embodiment of the invention, the vertical PN junction 104a proximate to the top surface of the semiconductor substrate 100 is situated directly underneath the main gate portion 212. According to one embodiment of the invention, the vertical PN junction 106a proximate to the top surface of the semiconductor substrate 100 is situated directly underneath the main gate portion 212. By providing such configuration, a higher gated source/drain junction breakdown voltage can be provided. According to one embodiment of the invention, the PUF bit storage transistor $T_{DS}$ has a gate-to-source/drain breakdown voltage that is lower than a gate-to-channel breakdown voltage and the gated source/drain junction breakdown voltage.

As shown in FIG. 13, an interlayer dielectric (ILD) layer 240 is then deposited on the semiconductor substrate 100. The ILD layer 240 covers the PUF bit storage transistor $T_{DS}$. Subsequently, a contact plug 244 and a contact plug 246 may be formed in the ILD layer 240. An interconnect structure 254 and an interconnect structure 256 may be formed on the ILD layer 240. The interconnect structure 254 is electrically connected to the drain region 104 through the contact plug 244. The interconnect structure 256 is electrically connected to the source region 106 through the contact plug 246.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A physically unclonable function (PUF) circuit comprising:
   a substrate;
   at least a program control transistor comprising a gate coupled to a program control line, a drain region coupled to a bit line, and a source region coupled to a source line;
   at least a program select transistor comprising a gate coupled to a program select line, a drain region, and a source region coupled to a ground line;
   at least a read select transistor comprising a gate coupled to a read select line, a drain region coupled to the bit line, and a source region; and
   at least a PUF bit storage transistor having a gate-to-source/drain breakdown voltage lower than a gate-to-channel breakdown voltage and a gated source/drain junction breakdown voltage, the at least a PUF bit storage transistor comprising;
   a drain region formed on the substrate and coupled to the source region of the at least a read select transistor;
   a source region formed on the substrate and coupled to the source line;
   a channel region formed between the drain region of the at least a PUF bit storage transistor and the source region of the at least a PUF bit storage transistor;
   a gate dielectric layer having a first portion formed on the drain region of the at least a PUF bit storage transistor, a second portion formed on the source region of the at least a PUF bit storage transistor, and a main portion formed on the channel region and between the first portion and the second portion, thicknesses of the first portion of the gate dielectric layer and the second portion of the gate dielectric layer being smaller than a thickness of the main portion of the gate dielectric layer; and
   a gate electrode coupled to the source region of the at least a program select transistor, and formed on the main portion of the gate dielectric layer.

2. The PUF circuit of claim 1, wherein the gate electrode comprises:
   a main gate portion disposed directly above the channel region;
   a first gate extension portion disposed beside the main gate electrode and on the first portion of the gate dielectric layer; and
   a second gate extension portion disposed beside the main gate electrode and on the second portion of the gate dielectric layer.

3. The PUF circuit of claim 2, wherein the main gate portion, the first gate extension portion, the second gate extension portion are composed of doped polysilicon, silicide, or metal.

4. The PUF circuit of claim 2, wherein the at least a PUF bit storage transistor further comprises:

a first dielectric spacer formed beside the first gate extension portion; and
a second dielectric spacer formed beside the second gate extension portion.

5. The PUF circuit of claim 4, wherein:
the first dielectric spacer is in direct contact with the drain region of the at least a PUF bit storage transistor; and
the second dielectric spacer is direct contact with the source region of the at least a PUF bit storage transistor.

6. The PUF circuit of claim 4, wherein:
the first dielectric spacer is direct contact with the first portion of the gate dielectric layer; and
the second dielectric spacer is direct contact with the second portion of the gate dielectric layer.

7. The PUF circuit of claim 2, wherein
a first PN junction between the drain region and the channel region of the at least a PUF bit storage transistor has an end situated directly underneath the main gate portion of the gate electrode; and
a second PN junction between the source region and the channel region of the at least a PUF bit storage transistor has an end situated directly underneath the main gate portion of the gate electrode.

8. The PUF circuit of claim 1 wherein the thicknesses of the first portion of the gate dielectric layer and the second portion of the gate dielectric layer are substantially equal.

9. A method of programming a physically unclonable function (PUF) circuit, the PUF circuit comprising a substrate, at least one PUF bit storage transistor, at least a program control transistor, at least a program select transistor and at least a read select transistor, the at least a PUF bit storage transistor having a gate-to-source/drain breakdown voltage lower than a gate-to-channel breakdown voltage and a gated source/drain junction breakdown voltage, the at least a program control transistor comprising a gate coupled to a program control line, a drain region coupled to a bit line, and a source region coupled to a source line, the at least a program select transistor comprising a gate coupled to a program select line, a drain region, and a source region coupled to a ground line, and the at least a read select transistor comprising a gate coupled to a read select line, a drain region coupled to the bit line, and a source region, the at least a PUF bit storage transistor comprising a drain region formed on the substrate and coupled to the source region of the at least a read select transistor, a source region formed on the substrate and coupled to the source line, a channel region formed between the drain region of the at least a PUF bit storage transistor and the source region of the at least a PUF a bit storage transistor, a gate dielectric layer having a first portion formed on the drain region of the at least a PUF bit storage transistor, a second portion formed on the source region of the at least a PUF bit storage transistor, and a main portion formed on the channel region and between the first portion and the second portion, and a gate electrode formed on the main portion of the gate dielectric layer and coupled to the source region of the at least a program select transistor, thicknesses of the first portion of the gate dielectric layer and the second portion of the gate dielectric layer are smaller than a thickness of the main portion of the gate dielectric layer, the method comprising:
applying a program select voltage to the program select line;
applying a read select voltage to the read select line, the read select voltage exceeding the gate-to-source/drain breakdown voltage; and
applying a high voltage to the bit line and the source line simultaneously.

10. The method of claim 9, wherein simultaneously applying the high voltage to the bit line and the source line comprising:
floating the source line;
applying a program control voltage to the program control line, the program control voltage exceeding the gate-to-source/drain breakdown voltage; and
applying the high voltage to the bit line.

11. The method of claim 9, wherein the high voltage exceeds the gate-to-source/drain breakdown voltage.

12. The method of claim 9, wherein the high voltage is a variable voltage ramping upwards until the gate-to-source/drain breakdown voltage is reached.

13. The method of claim 9, wherein the high voltage ranges from 3V to 10V, the program control voltage ranges from 3V to 10V, and the program select voltage ranges from 1V to 3V, and the read select voltage ranges from 3V to 10V.

14. The method of claim 9, wherein the at least a program control transistor is turned on by the program control voltage, the at least a program select transistor is turned on by the at least a program select voltage, and the at least a read select transistor is turned on by the read select voltage.

15. A method of reading a physically unclonable function (PUF) circuit, the PUF circuit comprising a substrate, at least one PUF bit storage transistor, at least a program control transistor, at least a program select transistor and at least a read select transistor, the at least a PUF bit storage transistor having a gate-to-source/drain breakdown voltage lower than a gate-to-channel breakdown voltage and a gated source/drain junction breakdown voltage, the at least a program control transistor comprising a gate coupled to a program control line, a drain region coupled to a bit line, and a source region coupled to a source line, the at least a program select transistor comprising a gate coupled to a program select line, a drain region, and a source region coupled to a ground line, and the at least a read select transistor comprising a gate coupled to a read select line, a drain region coupled to the bit line, and a source region, the at least a PUF bit storage transistor comprising a drain region formed on the substrate and coupled to the source region of the at least a read select transistor, a source region formed on the substrate and coupled to the source line, a channel region formed between the drain region of the at least a PUF bit storage transistor and the source region of the at least a PUF bit storage transistor, a gate dielectric layer having a first portion formed on the drain region of the at least a PUF bit storage transistor, a second portion formed on the source region of the at least a PUF bit storage transistor, and a main portion formed on the channel region and between the first portion and the second portion, and a gate electrode formed on the main portion of the gate dielectric layer and coupled to the source region of the at least a program select transistor, thicknesses of the first portion of the gate dielectric layer and the second portion of the gate dielectric layer are smaller than a thickness of the main portion of the gate dielectric layer, the method comprising:
applying a bit line voltage to the bit line;
applying a ground voltage to the program control line, the program select line and the source line; and
applying a read select voltage to the read select line.

16. The method of claim 15, wherein the bit line voltage ranges from 0.5V to 2V, the ground voltage is substantially 0V, and the read select voltage ranges from 1V to 3V.

17. The method of claim 15, wherein the at least a program control transistor and the at least a program select transistor are turned off by the ground voltage, and the at least a read select transistor is turned on by the read select voltage.

\* \* \* \* \*